Feb. 18, 1947. J. H. McINTYRE 2,416,189
PLANTER RUNNER
Filed May 31, 1946 2 Sheets-Sheet 1
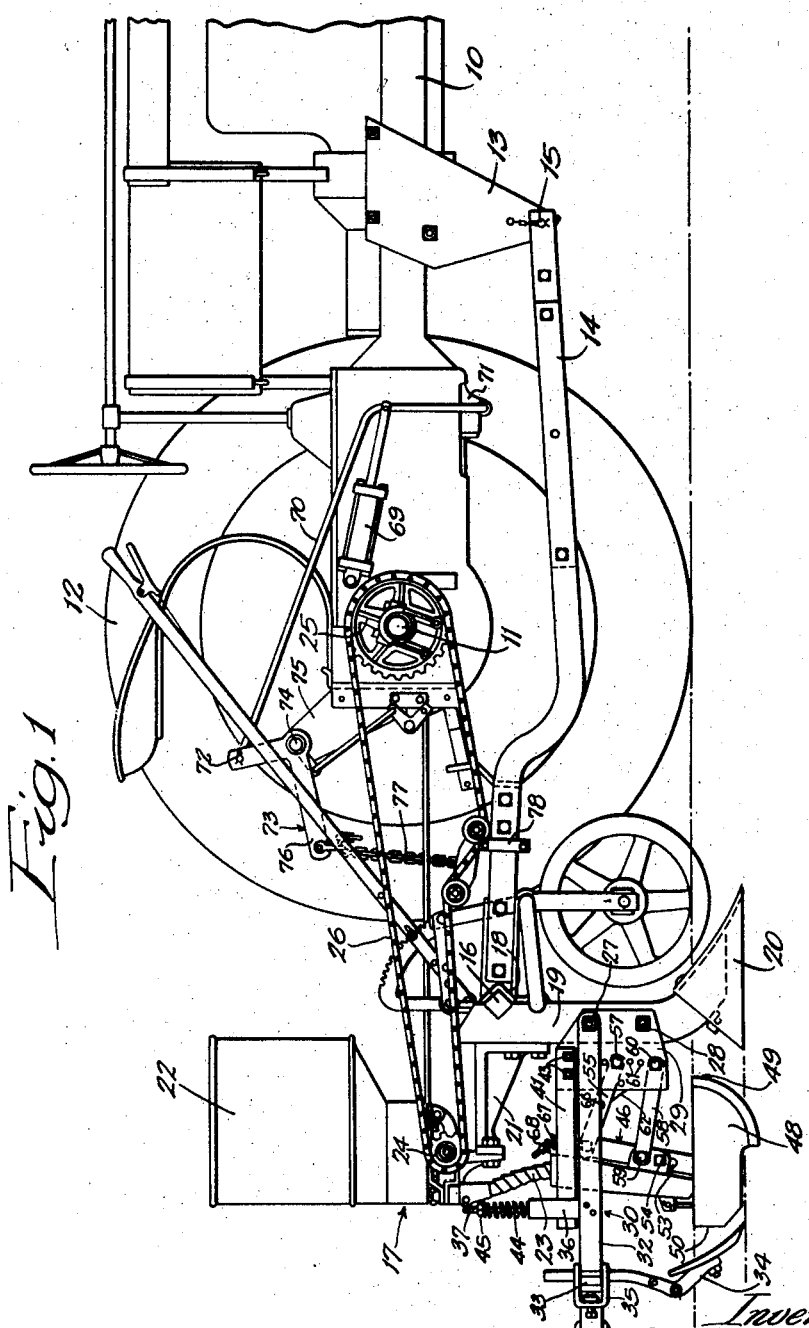

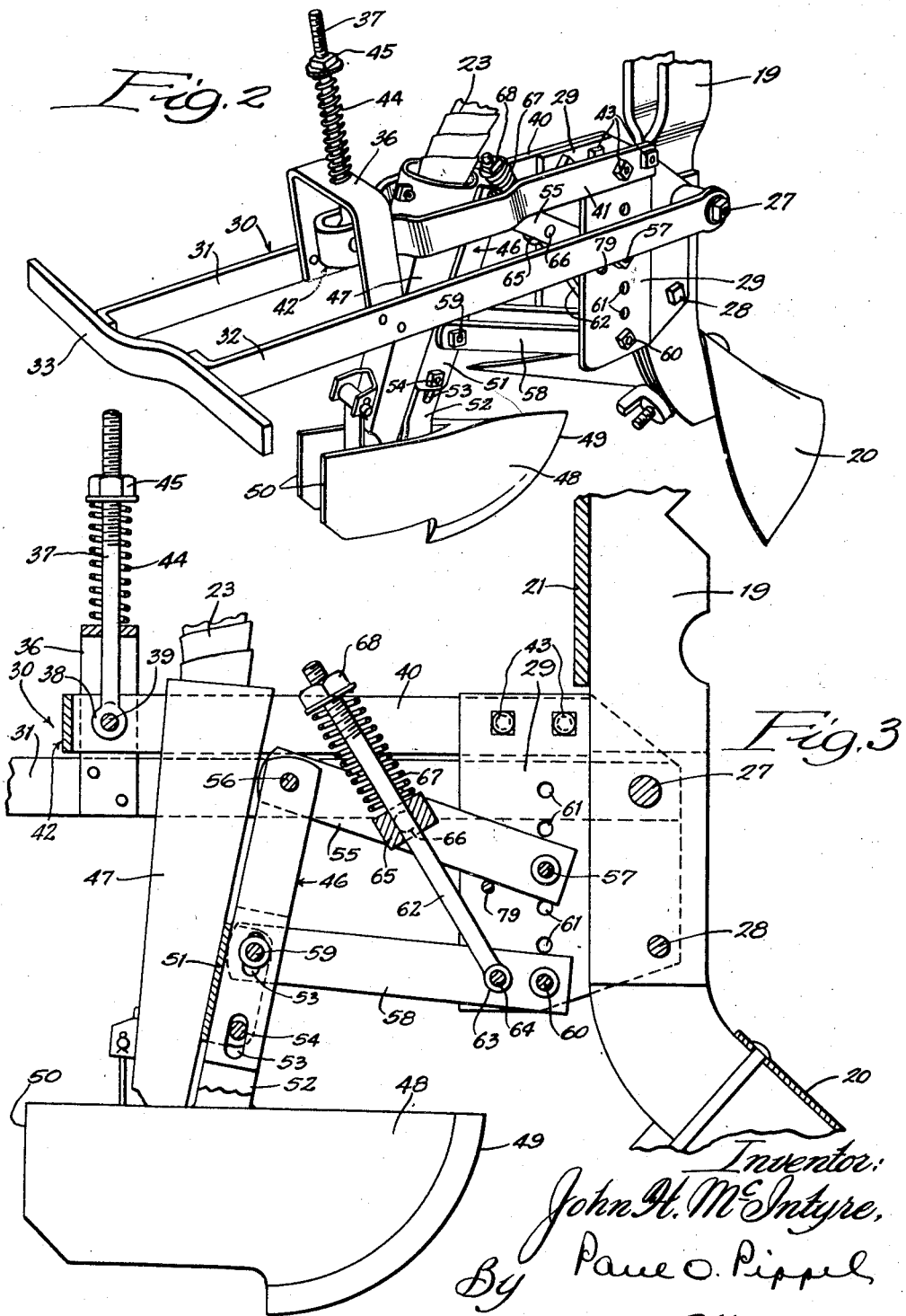

Patented Feb. 18, 1947

2,416,189

UNITED STATES PATENT OFFICE 2,416,189

PLANTER RUNNER

John H. McIntyre, Cisco, Tex., assignor to International Harvester Company, a corporation of New Jersey Application May 31, 1946, Serial No. 673,239½

4 Claims. (Cl. 111—85)

This invention relates to runners employed in conjunction with seed planting units to open a furrow for the reception of seed. More particularly, the invention concerns an improved mounting for planter runners.

A seed planter generally comprises a furrow opener adapted to break the soil, a runner with a seed spout associated therewith mounted behind the furrow opener to open a furrow for the deposition of seed, and a covering mechanism mounted behind the runner to cover the seed after it has been deposited. The entire unit is generally drawn by a tractor and is connected thereto in such a way as to permit the raising and lowering of the implement with respect to the ground.

It is known to provide tripping mechanisms for the plow bottom or other ground-working tool to cause it to trip backward upon striking an obstruction, and the runner is generally provided with an upwardly curved, forward edge to assist it in riding over the obstruction. However, the runner and its supporting mechanism, which ride directly behind the furrow opener, are subjected to severe shocks when the obstruction is encountered, sometimes resulting in severe damage to the runner.

The present invention contemplates the provision of a flexibly mounted runner, and one of the objects is the provision of means for permitting the runner to ride over obstructions independently of the plow and covering apparatus.

Another object is to provide means for urging the runner into ground-engaging position and means for permitting the runner to rise in a vertical plane when an obstruction or uneven ground is encountered.

With these and other objects in view, a pair of generally parallel, vertically spaced links is provided, the forward ends of which are pivotally mounted upon vertically extending plates affixed to the plow beam, and the rear ends of which provide the sole support for the runner standard with which is associated the dispenser spout of the seed dispensing mechanism. The runner is biased to ground-engaging position by means of a compression spring mounted upon a bolt pivoted at one end upon the lower link and slidably extending through a swivel keyed to the upper link. Upon the runner striking an obstruction, it moves upwardly against the action of the spring and, upon passing the obstruction, is again urged to ground-engaging position.

Other objects and advantages of the invention will appear from the following detailed description when read in conjunction with the accompanying drawings, wherein:

Figure 1 is a side elevation of the rear portion of a tractor with one wheel removed and with a planter connected thereto embodying the features of the present invention;

Figure 2 is a perspective view of the lower portion of the planter showing a ground-working tool in the form of a sweep and illustrating the mounting of the runner; and Figure 3 is a fragmentary side elevation of the mechanism shown in Figure 2 with parts broken away to show the parallel link and compression spring mounting of the planter runner.

Referring to the drawings, the numeral 10 designates the longitudinally extending body portion of a tractor having a transverse rear axle 11 and rear wheels 12. Connected to the body portion 10 of the tractor is a depending bracket 13 to which a beam 14 is connected, as at 15, for vertical pivotal movement. The beam 14 extends rearwardly beyond the rear axle structure and supports a transverse tool bar 16 upon which is mounted a planter unit generally indicated at 17. While only one planter unit is shown in the drawing, it should be understood that a number of similar units may be mounted upon the tool bar 16 at spaced points therealong. The planter unit is mounted upon the tool bar 16 by means of a bracket 18 and includes a vertical plow beam 19 having an earth-working tool in the form of a sweep 20 attached to the base thereof. Projecting rearwardly from the upper part of the beam 19 is a bracket 21 upon which is mounted a seed can 22 provided with a downwardly extending seed spout 23, and driven by sprockets 24 and 25 connected respectively to the seed can drive gear and the rear axle 11 of the tractor. Power is transmitted from the sprocket 25 to the sprockets 24 by a chain 26.

Mounted upon the plow beam 19 by means of vertically spaced bolts 27 and 28 and extending rearwardly therefrom is a pair of laterally spaced plates 29. The bolt 27 extends transversely through the beam 19 and provides a pivotal connection for a coverer frame 30, the spaced arms 31 and 32 of which are pivoted upon the ends of bolts 27, and the rearwardly projecting ends of which are joined by a cross-piece 33 upon which covering tools 34 are mounted by means of brackets 35. The arms 31 and 32 are connected by a U-shaped brace 36 having an opening to receive for sliding movement therein an eye-bolt 37. The eye 38 of the bolt 37, extending downwardly from the brace 36, is pivotally mounted upon a pin 39 extending between arms 40 and 41 of a bracket 42 affixed to plates 29 by the bolts 43. The upwardly projecting shank of the eye-bolt 37 is surrounded by a spring 44, and its end is screw-threaded to receive a nut 45 for adjustment of the tension upon the spring.

A runner standard 46, having the seed spout 23 and its protective sheath 47 associated therewith, extends in a vertical plane between the arms of brackets 30 and 42 and carries at its lower end a runner 48 having an upwardly curved forward cutting edge 49 for opening a seed furrow, and rearwardly projecting arms 50 within which the lower end of the seed spout is confined. The standard 46 comprises a sheath 51 and an insert member 52 having slots 53 therein and connected by bolts 54 for the adjustment of the runner with respect to its standard. The runner with its standard and seed spout assembly is suspended from plates 29 by a parallel link arrangement comprising upper links 55 pivoted upon the runner standard 46 by bolts 56 and upon plates 29 by bolts 57. Vertically spaced lower links 58 are generally parallel to the links 55 and are similarly pivoted upon the runner standard and the plates 29 by bolts 59 and 60, respectively. It will be noted that the plates 29 are provided with a number of openings 61 to adjust the angular relation of the parallel links and the angle assumed by the runner standard with respect to the ground. By this arrangement, it will be observed that the runner 48 will maintain at all times its proper angular relation with the ground being worked so that uniform planting of seed may be accomplished. In order to maintain the proper vertical relationship of the runner with respect to the other tools and to permit upward vertical flexing of the runner assembly when obstructions are encountered, the links are connected by an eye-bolt and spring arrangement comprising an eye-bolt 62, having an eye 63 at the lower end thereof pivotally mounted upon a pin 64 extending between the lower links 58 at a point near the pivot of links 58 upon the plate 29. The shank of the bolt 62 extends upwardly and rearwardly and passes through a swivel member 65 pivoted between the links 55 near the middle thereof by a pin 66. The bolt 62 is adapted for sliding movement in the swivel member 65, such movement being limited by a spring 67 abutting against the swivel member at one end and against a nut 68 at its other end. The tension upon the spring 67 is regulated by the adjusting nut 68 upon the threaded end of the bolt 62.

Vertical movement of the entire planter unit with respect to the tractor is effected about the pivot point 15 by conventional mechanism comprising a fluid cylinder 69, powered from the tractor, connected to a link 70, pivoted upon a bracket 71 affixed to the body of the tractor. An arm of the link 70 extends rearwardly and is connected to an arm 72 of a bell-crank 73 pivoted at 74 upon a bracket 75 affixed to the rear axle housing of the tractor. Another arm 76 of the bell-crank is connected by a chain 77 to a bracket 78 affixed to the rear portion of the beam 14. Rocking of the bell-crank 73 to raise or lower the planter unit is effected by actuation of the fluid cylinder device 69.

It will thus be noted that a novel and effective flexible mounting for runner openers for seed planters has been provided, wherein the runner has vertical movement independent of the other tools in the assembly, whereby obstacles encountered in planting may be avoided and shocks to the supporting framework prevented. In the drawings the runner is shown in its down position. When an obstacle is encountered, the runner rises against the tension in the spring 67. When the obstacle is passed, the compressed spring again urges the runner into ground-engaging position. The downward movement of the runner is limited by a stop comprising a pin 79 extending between the plates 29 and adapted to contact the lower edge of upper links 55 when the runner is in ground-working position.

Having now described the invention in its preferred embodiment, it should be understood that changes may be made therein without departing from the spirit of the invention or the scope of the appended claims.

What is claimed is:

1. In a planter, a frame, a furrow opener standard connected to the frame, a pair of vertically spaced generally parallel link members pivotally connected to the standard for vertical movement, a runner pivotally connected to the link members for vertical movement therewith, means for adjusting the angular relationship of said link members to vary the angle of the runner with respect to the ground, and yieldable means connecting said link members arranged to bias said runner to ground-engaging position.

2. In a planter, a frame, a furrow opener standard connected to the frame, a pair of vertically spaced rearwardly extending link members pivotally connected to the standard for vertical movement, a runner pivotally connected to the rear ends of the link members, means for adjusting the vertical spacing of the pivotal connections of the link members to the said standard, yieldable means connecting said link members arranged to bias said runner to ground-engaging position, and means for limiting the downward movement of said runner.

3. In a planter, a frame, a furrow opener standard connected to the frame, a pair of vertically spaced rearwardly extending generally parallel link members pivotally connected to the standard for vertical movement, a runner pivotally connected to the rear ends of the link members, means for adjusting the vertical spacing of the pivotal connections of the link members to the said standard, and a spring tension member connected to the lower link adjacent its pivot upon said standard and to the upper link at a point remote from its pivot upon said standard adapted to bias said runner to ground-engaging position and to yield upon upward movement of said runner.

4. In a planter, a frame, a furrow opener standard connected to the frame, a pair of vertically spaced rearwardly extending generally parallel link members pivotally connected to the standard for vertical movement, a runner pivotally connected to the rear ends of the link members, means for adjusting the vertical spacing of the pivotal connections of the link members to the said standard, an eye-bolt pivoted upon the lower link and having an upwardly projecting shank, a swivel member pivoted upon the upper link and having an opening arranged to accommodate said shank for sliding movement therein, an adjustable nut upon the upper end of said bolt, and a spring surrounding the bolt between said nut and said swivel.

JOHN H. McINTYRE.

REFERENCES CITED

The following references are of record in the file of this patent:

UNITED STATES PATENTS

| Number | Name | Date |
|---|---|---|
| 1,242,591 | Raulz | Oct. 9, 1917 |
| 2,280,107 | Stute | Apr. 21, 1942 |
| 662,823 | Rhodes | Nov. 27, 1900 |